United States Patent [19]

Dunlap

[11] 4,215,834
[45] Aug. 5, 1980

[54] COMPOUND AEROSTAT OF CONTROLLABLE ALTITUDE

[75] Inventor: Richard M. Dunlap, Middletown, R.I.

[73] Assignee: The United States of America as represented by the Secretary of the Navy, Washington, D.C.

[21] Appl. No.: 969,770

[22] Filed: Dec. 15, 1978

[51] Int. Cl.$^3$ .............................................. B64B 1/62
[52] U.S. Cl. .......................................... 244/97; 55/70; 252/372; 568/840
[58] Field of Search ................. 244/30, 31, 33, 96–98, 244/128; 55/70, 74; 252/372; 568/840

[56] References Cited

U.S. PATENT DOCUMENTS

| | | | |
|---|---|---|---|
| 1,097,201 | 5/1904 | Upson | 244/97 |
| 1,755,359 | 4/1930 | Moses | 244/97 |
| 2,730,626 | 1/1956 | Varney | 244/97 |
| 3,315,441 | 4/1967 | Hutton et al. | 55/70 |
| 3,432,122 | 3/1969 | Flickinger | 244/31 |
| 3,531,064 | 9/1970 | McCuthchan | 244/31 |
| 4,012,016 | 3/1977 | Davenport | 244/97 |

OTHER PUBLICATIONS

Bailor et al., "Comprehensive Inorganic Chemistry," Pergamon Press, 1973, pp. 346–348, 360.

*Primary Examiner*—Galen L. Barefoot
*Attorney, Agent, or Firm*—Richard S. Sciascia; Arthur A. McGill; Prithvi C. Lall

[57] ABSTRACT

A compound aerostat employing a primary lifting mixture of helium and methanol in a first enclosure and a secondary lifting mixture of ammonia in a second enclosure. Both enclosures are contained within a single envelope. The methanol in the primary enclosure gradually condenses out as the altitude increases yielding a decreasing lift with altitude up to the stratosphere to provide passive altitude stability to the system. An absorbent, metallic lithium is provided within a separate container and connected to controllably absorb the ammonia and thereby control the displacement of the secondary enclosure. The process is reversible with the application of heat by means of propane combustion or solar heating. Other absorbents are LiNO$_3$, LiCl and CaCl$_2$. This controllable displacement system can compensate for solar superheat and snow and ice accumulation and facilitate long endurance flights, especially in the troposphere.

12 Claims, 4 Drawing Figures

COMPOUND AEROSTAT OF CONTROLLABLE ALTITUDE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to a lifting system in a limp aerostat. The lifting system is particularly suitable for the troposphere. It has a primary and secondary enclosure within a single envelope with each enclosure containing gas compositions that operate independently of each other for controlling lift.

A previous system of maintaining a limp aerostat within the troposphere relies on the release of ballast by night and lifting gas by day. The altitude varies over a wide range. The flight endurance of this system is limited by the need to dump about 15 percent of the gas and ballast during each 24 hour period. An alternate method is to use a taut aerostat which seeks out an altitude where the atmospheric density equals that of the aerostat. This requires strong fabric. Moreover, a small pin hole leak will result in considerable loss of lift over a period of days and will result in flight termination. Ice accumulation can sink the aerostat even more rapidly.

SUMMARY OF THE INVENTION

It is therefore an object of the present invention to provide a mass-conservative, limp, not taut, constant altitude aerostat system free of the above deficiencies. The system comprises two limp compartments designated the primary and secondary enclosures. These enclosures are within a single envelope.

The primary enclosure provides the primary source of lift and contains helium and methanol. The methanol condenses as the altitude increases. The secondary enclosure contains a condensible lifting gas, anhydrous ammonia. The secondary enclosure is connected to an absorbent to controllably absorb the ammonia and thereby control the displacement of the envelope by controlling the displacement of the secondary enclosure. The absorption is reversible by means of heating the ammonia to cause it to expand and return to the secondary enclosure.

DESCRIPTION OF THE PREFERRED EMBODIMENT

Figure 1:
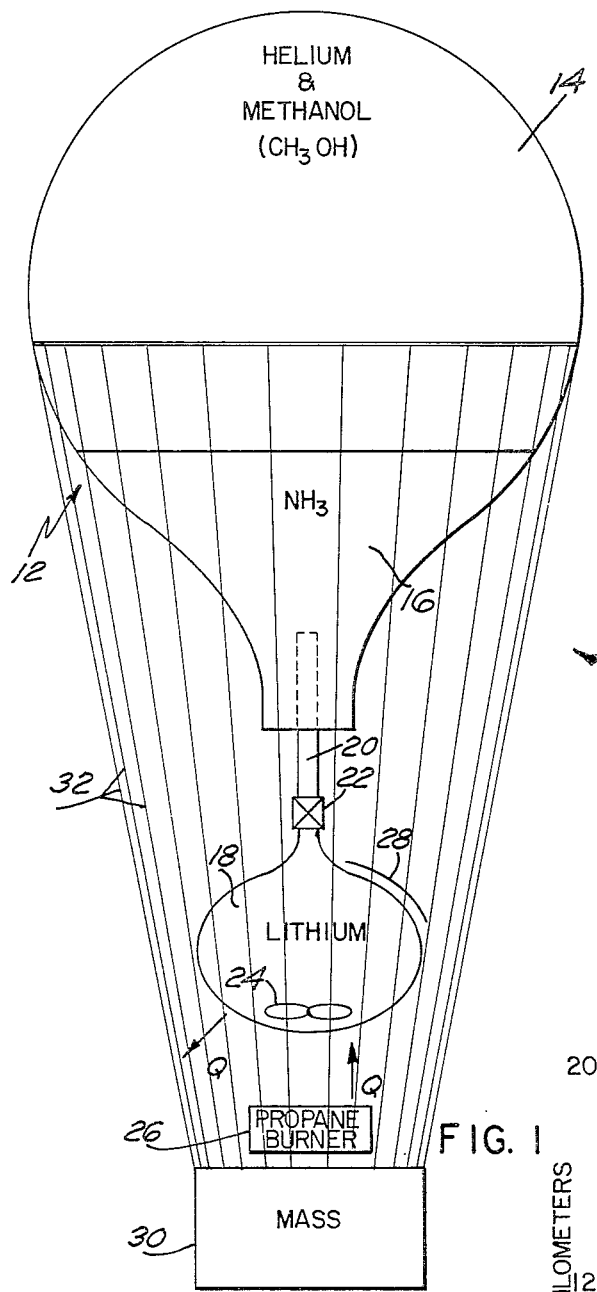
FIG. 1 is a pictorial representation of the controllable altitude aerostat of the present invention.

Referring now to FIG. 1 there is shown a controllable altitude aerostat 10. An envelope 12 is comprised of a primary enclosure 14 and a secondary enclosure 16. Both enclosures 16 and 14 form portions of the walls of envelope 12. Having both enclosures 14 and 16 within envelope 12 reduces aerodynamic drag and handling problems during buffeting winds. The primary enclosure 14, as the name implies, is the primary source of lift for the aerostat 10, and contains a mixture of about 90 percent helium and 10 percent methanol, $CH_3OH$. The helium is selected to provide lift. The small amount of methanol, which is chosen because of its appropriate boiling point of 64.7° C. and low formula weight of 32.04 is just totally evaporated at sea level in the standard U.S. atmosphere. Its partial pressure in the mixture equals its saturation pressure at all times. As the altitude in the troposphere increases, the methanol gradually condenses out of the system onto the surface of the primary enclosure 14 causing the volume of air displaced by the envelope 12 to decrease; hence, a decrease in lift. Conversely, an altitude decrease causes the film or drops of methanol on the enclosure to reevaporate and increase the lift. Note from FIG. 2, however, that above an altitude of 9 kilometers the methanol is destabilizing.

Referring again to FIG. 1 the secondary enclosure 16 which forms a part of envelope 12 contains a condensible lifting gas, anhydrous ammonia, $NH_3$.

The envelope 16 is connected to an envelope 18 containing lithium via a line 20 with a valve 22. The envelope 18 has an agitator 24 to enhance operation. A propane burner 26 and insulation 28 are provided to dissociate the ammonia from the material. The insulation 28 should be easily removable so as to be used only during dissociation. The mass 30 includes passengers, equipment, food, etc. and is connected by lines 32.

Figure 2:
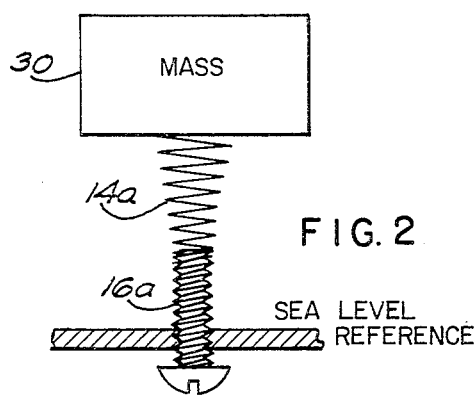
FIG. 2 is an analog of the operation of the aerostat of FIG. 1.

FIG. 2 is an analog of the present invention in which the height of the mass 30 is controlled by a spring 14a which represents the primary enclosure 14. The adjustable screw 16a represents the secondary enclosure 16 as controlled by the lithium 18, line 20, valve 22, agitator 24, propane burner 26 and insulation 28.

In operating during the day the aerostat 10 is raised to a predetermined altitude mainly by the primary lifting mixture of helium and methanol. The methanol condensing determines the stable altitude. During nightfall as the atmosphere cools additional condensation of the methanol and cooling of the gases lowers the altitude of the aerostat 10. At this time the ammonia absorbed within the third enclosure 18 is heated by propane burner 26. This dissociates the ammonia from the metallic lithium and vaporizes the ammonia so that upon the opening of valve 22 the ammonia passes through line 20 into enclosure 16. This action raises the height of the aerostat thereby taking the place of dropping sand ballast. When the altitude of the aerostat rises excessively and beyond the ability of the methanol to further condense due to solar heat, loss of ice or adhered precipitation the ammonia is admitted to the absorbent. There, the ammonia is absorbed with the release of heat to the atmosphere. This decreases the displacement, hence the lift, and the aerostat descends.

Methanol, $CH_3OH$ included within enclosure 14 has a saturation pressure as a function of temperature, given by the Antoine Equation as quoted by Boublik, Fried and Hala $$\log_{10} P mmHg = A - [B/(t+c)]$$

where the constants
A = 9.2250
B = 2239.
C = 288.5 are computed by fitting the Antoine Equation to the data in Perry

| t° C. | Pmm |
|---|---|
| −6.0 | 20 |
| 2.1 | 60 |
| 34.8 | 200 |
| (P N/m² = PmmHg × $\rho_{Hg}$ g = 133.32 PmmHg) | |

The lift of this primary system is computed for one Kg/mol of mixture in which the methanol is all vapor at a partial pressure equal to its saturation pressure at sea level with the balance made up of helium.
Defining
  R=gas constant for air=287.02 N−m/°K.−Kg air
  g=accel of gravity=9.807 m/sec²
  γ=Lapse rate of troposphere=6.5° C. Km⁻¹
  L=lift
  X=mol fraction of methanol in gas mixture
  $X_o$=mol fraction of methanol at sea level
  Z=mols of CH₃ OH gas at altitude
  M=molecular weight subscripts

| A = air | $M_A$ = 28.97 |
|---|---|
| B = helium | $M_H$ = 4.00 |
| C = condensible gas $M_c$ = 32.04 (methanol) | | we may observe that the number of mols of helium at any altitude is $(1=X_o)$
and $X=P_{sat}/P_{atm}$ where $P_{atm}=p_o(T/T_o)^{g/R\gamma}$ according to Hess
and $X=Z/(1-X_o+Z)$ so that $$Z=(1-X_o)(X^{-1}-1)^{-1}$$

the lift is then $$L=(1-X_o)(M_a-M_H)+Z\,M_a-X_o M_c$$

Figure 3:
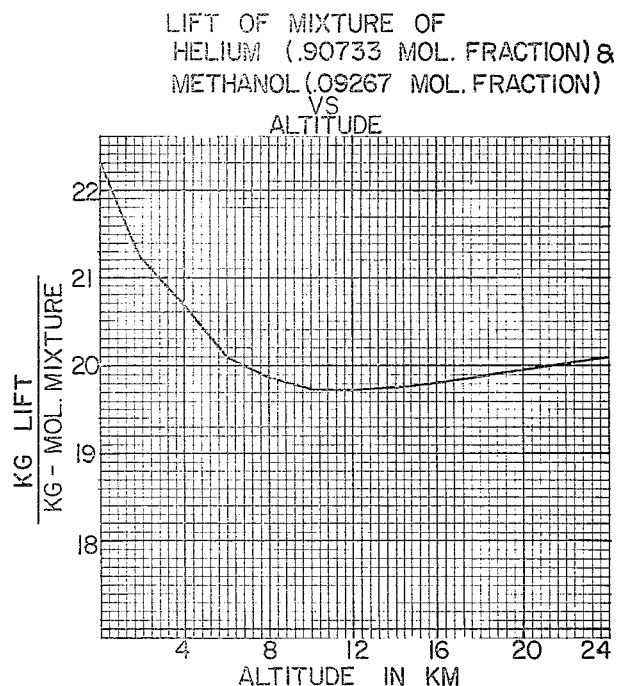
FIG. 3 is a graph of the lift of the mixture of helium and methanol for various altitudes.
Figure 4:
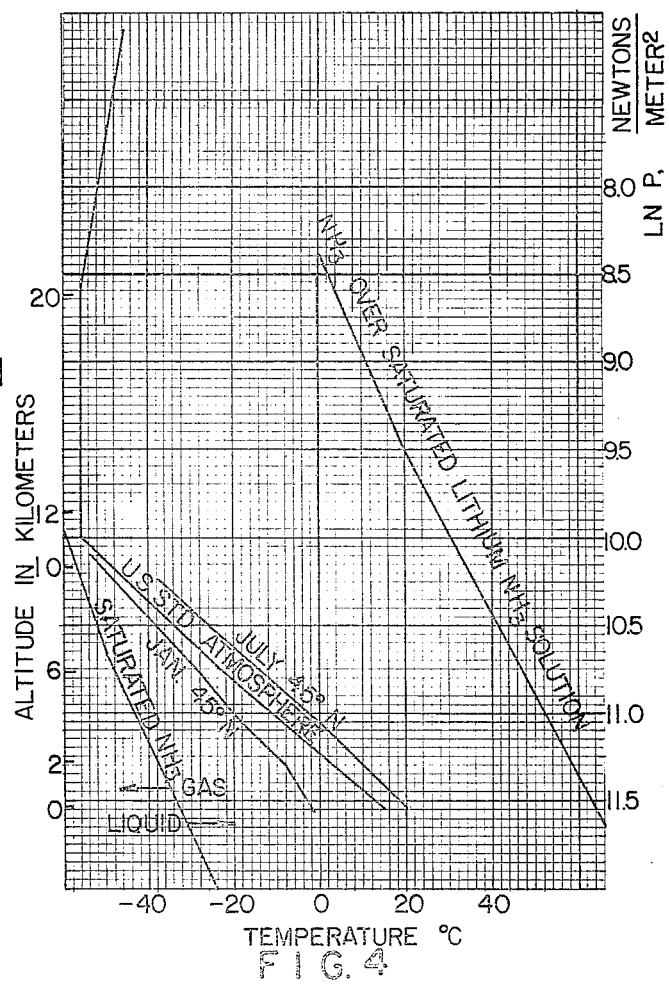
FIG. 4 is a graph of pressure and altitude vs. temperature for atmosphere, saturated ammonia and ammonia over saturated lithium solution.

This standard atmosphere is plotted in FIG. 4 along with the January and July atmospheres for 45° N. For the U.S. Standard Atmosphere the lift L is computed for various altitudes and plotted in FIG. 3 using the above equations which are summarized below for convenience.

$$P_{atm}=101325\,[(t+273.15)/288.15]^{5.2567}$$

$$P_{sat}\,N/m^2 = 133.32 \times 10^{(9.2250 - \frac{2239}{t+288.5})}\,N/m^2$$

$X=P_{sat}/P_{atm};\ X_o=(P_{sat}/P_{atm})$ sea level $$L=(1-X_o)(24.97+28.97\,(X^{-1}-1)^{-1})-32.04\,X_o$$

The ammonia, located within secondary enclosure 16, has a vapor pressure as a function of temperature given by Antoine's Equation, as given by Boublik, Fried and Hala $$\log_{10} P_{mmHg}=A-[B/(t+c)]$$

where
  A=7.4404
  B=954.19
  C=242.63
These constants are computed by fitting the equation to the following data

| t° C. | Pmm |
|---|---|
| −77 | 47.8 |
| −47. | 365.5 |
| −20. | 1427.0 |

The formula weight of ammonia is 17.03; its boiling point at 760 mm is −33.35° C.

Saturated ammonia pressures for various altitude of the U.S. Standard Atmosphere are plotted in FIG. 4. Ammonia is toxic but gives ample olefactory warning of its presence. Its flammability limits with air are from 16 to 26 percent NH₃. It is difficult to ignite.

Ammonia is chosen because of its low molecular weight and its stability to be absorbed in large amounts by a variety of materials including water, calcium chloride, lithium chloride, lithium nitrate and pure lithium. Ammonia is a vapor under almost all conditions in the earth's atmosphere; the absorbents listed below when saturated and in temperature equilibrium with the atmosphere have vapor pressures less than ambient atmospheric pressure under virtually all natural conditions. The solution or combination of ammonia with these material is accompanied by a release of heat; conversely, the application of heat will dissociate the ammonia from the material. Thus, the operation is easily reversible with simple apparatus and changes in displacement, hence lift, easily accomplished. Below are listed the material in order of their ability to absorb NH₃:

| Material | Reference | Mass per unit mass NH₃ t° C., p = 100mn | |
|---|---|---|---|
| Lithium | Marshall & Hunt Johnson & Piskur | .1132 | +20.5 |
| LiCl . 5NH₃ | Bonnefoi; Biltz | .4978 | −49. |
| CaCl₂ 8NH₃ | Huttig; Linge | .8147 | −2. |
| LiCl 3NH₃ | Bonnefoi; Biltz | .8297 | +23.5 |
| LiNO₃ . 4NH₃ | Chinnapa; Buffington; Berestneff | 1.012 | |

Lithium is by far the best, absorbing about nine grams of ammonia per gram of lithium with a sub-atmospheric vapor pressure in virtually all atmospheres. The solution formed is not a compound. The important data for lithium-ammonia solutions is given below:

| t° C. | p cmHg (Marshall & Hunt) | g Li/g NH₃=B (Johnson & Piskur) |
|---|---|---|
| −63.8 | .005 | — |
| −63.5 | — | .10698 |
| −45.4 | .055 | — |
| −33.2 | — | .10866 |
| −32.7 | — | .10895 |
| −22.9 | .760 | — |
| 0.0 | 3.285 | .11319 |
| 21.3 | 10.390 | — |
| 40. | 25.1 | — |

Conversion factor: p, $N/m^2 = 1333.2$ p cmHg
If we fit the equation
  $\log_{10} P$ cmHg$=A-(B/T)$ to the two data points at 0 and 21.3°, we get:

$$\log_{10} P2/P1 = -B\left(\frac{1}{T_2} - \frac{1}{T_1}\right) \text{ and}$$

$$B = -\log P2/P1 \frac{1}{\frac{1}{T_2} - \frac{1}{T_1}} = 1888.3 \text{ and}$$

$$A = \log_{10} P2 + \frac{B}{T_2} = 7.4296$$

From the simplified Clausius-Clapeyron Equation (which neglects the volume of the liquid solution and assumes NH₃ a perfect gas)

$$\Delta H \simeq \frac{RT^2}{P} \frac{\Delta P}{\Delta T}$$

we may compute in the vicinity of 0° C.

| t | T° K. | p cmHg |
|---|---|---|
| −5° C. | 268.15 | 2.4414 |
| 0° C. | 273.15 | 3.2851 |
| +5° C. | 278.15 | 4.3734 | so that $$H = \frac{8314}{17.03} \frac{N-M}{Kg - °K} \frac{273.15^2}{10} \frac{(4.3734 - 2.4414)}{3.2851}$$
$$\text{(NH}_3\text{)}$$
$$= 2.142 \times 10^6 \frac{N-M}{Kg - NH_3}$$

since 1 Kcal=4190. j=N-m H=511.2 Kcal/Kg NH₃. This is in agreement with Krauss.

The quantity of propane (heat of combustion of one g mol=530.7 Kcal; MW$_{C_3H_8}$=44.11; B.P.=−42.07° C.) required to drive 1 Kg of NH₃ from a lithium solution is $$F = 511.2 \frac{Kcal}{KgNH_3} \text{ gas } \frac{530.7}{44.11} \frac{Kcal}{Kg} \times 1000 - C_3H_8$$

F=0.0425 g C₃H₈/g NH₃ gas

For one mol of primary mixture consisting of helium and methanol, we need sufficient lift variation to accommodate the extra lift of solar superheat at one extreme and the extra weight of ice and snow at the other extreme.

Let us define:
y=total number of mols of NH₃
B=mass of Li required to absorb unit mass of NH₃=0.1132 (forms Li/NH₃ solution at 0° C.)
S=superheat, °C. above T
T=atmospheric temperature, °K.
$M_A$=M. W. air=28.97
$M_M$=M. W. mix=6.5985
$M_C$=MW NH₃=17.03
W=mass of ice
P=payload
$X_o$=mols of methanol at sea level (all vapor)=0.092666) observe that at altitude h we have 1-$X_o$ mols of helium and X mols of methanol gas. With solar superheat and no ice and no ammonia gas the equation for lift equilibrium is $$(1-X_o+X)(1+S/T)M_A - M_M - YM_c(1+B) - P = 0$$

With no solar superheat and with ice or snow present and all ammonia as gas, the equation for lift equilibrium becomes $$(1-X_o+X+y)M_A - M_M - Y(1+B)M_c - P - W = 0$$

subtraction and transposition yields $$y = \frac{W}{M_A} + (1 - X_o + X)\frac{S}{T} \text{ and}$$

$$P = (1 - X_o + X)\left(1 + \frac{S}{T}\right)M_A - M_M - yM_C(1+B)$$

for h=2 Km T=275.154° K. and if S/T=0.08, S=22.01° C. if W/$M_A$=0.12, then W=3.4764 and y=0.2 at h=2 Km X=0.055237 and P=19.73 Kg/Kg mol of primary mixture For a flight of n days, the total fuel requirement is S=n Fy $M_c$=0.145 n For n=10 days, S=1.45

An aerostat has been described which promises long endurance flight in both the troposphere and stratosphere under adverse conditions of solar superheating and ice and snow accumulation. It may be applied to meteorological survey, ocean surveillance, stratospheric communication relays, and sporting activity. Manned transatlantic and circumpolar flights in the troposphere appear probable with this system. The system and concepts described herein may permit exploration of the atmospheres of other planets.

It will be understood that various changes in the details, materials, steps and arrangement of parts, which have been herein described and illustrated in order to explain the nature of the invention may be made by those skilled in the art within the principle and scope of the invention as expressed in the appended claims.

What is claimed is:

1. A controllable altitude lifting system for an aerostat comprising:
   a passive altitude lifting control system including a first enclosure containing a primary gaseous fluid, said primary gaseous fluid having solely passive condensing and vaporizing means controlled by ambient conditions for providing altitude stability, said condensing and vaporizing means comprises methanol; and
   an active altitude lifting control system including a second enclosure having a secondary gaseous fluid within, absorbing means connected to controllably absorb said secondary gaseous fluid and dissociation and vaporization means for dissociating and vaporizing the absorbed secondary fluid.

2. A controllable altitude lifting system for an aerostat according to claim 1 having a single envelope containing said first and second enclosures.

3. A controllable altitude lifting system for an aerostat comprising:
   a passive altitude lifting control system including a first enclosure containing a primary gaseous fluid, said primary gaseous fluid having passive condensing means for providing altitude stability, said primary gaseous fluid comprises helium and methanol; and
   an active altitude lifting control system including a second enclosure having a secondary gaseous fluid within, absorbing means connected to controllably absorb said secondary gaseous fluid and dissociation and vaporization means for dissociating and vaporizing the absorbed secondary fluid, said secondary gaseous fluid comprises ammonia.

4. A controllable altitude lifting system for an aerostat according to claim 3 having a single envelope containing said first and second enclosures.

5. A controllable altitude liting system for an aerostat according to claim 3 wherein said active altitude lifting control system further comprises:
a third enclosure connected to said second enclosure, said third enclosure containing an absorbent for absorbing said ammonia;
heating means for providing heat to said third enclosure for dissociating said ammonia from said lithium and vaporizing said ammonia; and
an agitator located within said third enclosure for enhancing the absorption, dissociation and vaporizing processes.

6. A controllable altitude lifting system for an aerostat according to claim 5 having a single envelope containing said first and second enclosures, and said third enclosure is located outside of said single envelope.

7. A controllable altitude lifting system for an aerostat according to claim 6 wherein said absorbent is selected from the group consisting of lithium, calcium chloride, lithium nitrate and lithium chloride.

8. A controllable altitude lifting system for an aerostat according to claim 6 wherein said absorbent is lithium.

9. An envelope for a limp aerostat comprising:
first and second enclosures;
a primary gaseous fluid contained within said first enclosure, said primary gaseous fluid having solely passive condensing and vaporizing means controlled by ambient conditions for providing altitude stability, said condensing and vaporizing means comprises methanol; and
a secondary gaseous fluid located within said second enclosure capable of being absorbed by one of the group consisting of lithium, calcium chloride, lithium nitrate and lithium chloride.

10. An envelope for a limp aerostat comprising:
first and second enclosures;
a primary gaseous fluid contained within said first enclosure, said primary gaseous fluid having passive condensing means for providing altitude stability, said primary gaseous fluid comprises helium and methanol; and
a secondary gaseous fluid located within said second enclosure capable of being absorbed by one of the group consisting of lithium, calcium chloride, lithium nitrate and lithium chloride, said secondary gaseous fluid comprises ammonia.

11. An envelope for a limp aerostat comprising;
first and second enclosures;
a primary gaseous fluid contained within said first enclosure, said primary gaseous fluid having solely passive condensing and vaporizing means controlled by ambient conditions for providing altitude stability, said condensing and vaporizing means comprises methanol; and
a secondary gaseous fluid located within said second enclosure capable of being absorbed by lithium.

12. An envelope for a limp aerostat comprising:
first and second enclosures;
a primary gaseous fluid contained within said first enclosure, said primary gaseous fluid having passive condensing means for providing altitude stability, said primary gaseous fluid comprises helium and methanol; and
a secondary gaseous fluid located within said second enclosure capable of being absorbed by lithium, said secondary gaseous fluid comprises ammonia.

* * * * *